Aug. 27, 1968     H. L. NICHOLSON     3,399,025

PROCESS FOR DYEING THERMOPLASTIC STYRENE POLYMER GRANULES

Filed July 27, 1964

INVENTOR.
HAROLD L. NICHOLSON
BY David M. Bunnell
his Agent

United States Patent Office 3,399,025
Patented Aug. 27, 1968

3,399,025
PROCESS FOR DYEING THERMOPLASTIC
STYRENE POLYMER GRANULES
Harold L. Nicholson, Murrysville, Pa., assignor to Koppers
Company, Inc., a corporation of Delaware
Filed July 27, 1964, Ser. No. 385,416
10 Claims. (Cl. 8—4)

ABSTRACT OF THE DISCLOSURE

Styrene polymers are dyed by suspending the granules in aqueous medium and diffusing a water-insoluble, organic solvent-soluble dye into the granules by way of a penetrant under conditions of elevated temperature and pressure. The penetrant is a solvent for the dye and can also be a blowing agent for the polymer so that the polymer granules are both dyed and rendered expandable in the same operation.

---

This invention relates generally to the dyeing of thermoplastic styrene polymer granules and, more particularly, to the dyeing of styrene polymer granules in an aqueous suspension using oil soluble dyes.

Foamed styrene polymer structures are used in a large variety of applications such as refrigerators and freezers, building panels, coolers, drinking cups, buoys, toys, novelties and display items. Such structures are made from beads, pellets or granules of thermoplastic styrene polymers which have incorporated therein from about 3 to 15 percent by weight of polymer of a blowing agent which will cause the granules to expand when they are heated.

Normally, the structures or articles made from the expandable granules are white. The white articles are satisfactory for many purposes, but it is frequently desirable to produce colored articles. Attempts to color the finished articles involve additional steps but, more importantly, it is difficult to obtain uniform and reproducible colors. Painting is restricted to the use of water and alcohol based paints, since other solvents tend to attack and degrade the surface of the articles.

It is advantageous, therefore, to dye the individual granules before they are molded and Bianco Patent No. 3,020,247 describes a process for dyeing expandable polystyrene beads. The dyeing process of the Bianco patent is difficult to control. Furthermore, the beads can only be dyed on their surface, because the process has quite critical limits of time and temperature. Temperatures above 90° C. for example result in expansion of the beads. If the beads are immersed for longer than 30 minutes in the dye bath, they lose so much blowing agent that they will no longer expand to a low density on molding and they are degraded and attacked by the dye solvent.

I have now discovered that styrene polymer granules can be dyed by suspending the granules in an aqueous medium and forcing or diffusing a water-insoluble, organic solvent-soluble dye into the granules by way of a penetrant under conditions of elevated temperature and autogenous or superautogenous pressure, the penetrant being a solvent for the dye and being a liquid under the dyeing conditions.

In accordance with my invention, the dye penetrates or diffuses through the exterior into the interior of the polymer particle.

In accordance with this invention, polymer granules can be produced that have dye within the particles and the depth of dye within the particles is readily controlled by the varying of parameters such as time, temperature and pressure. Advantageously the dyed polymer granules have the dye essentially evenly dispersed throughout the polymer granules.

An advantage of this invention is that the granules retain their original size and shape throughout the process. Thus, except for a change in color, particles that are processed in accordance with this invention have the same physical appearance as the feed stock. For example, the dyed granules, in addition to having a uniform color, are smooth, glossy surfaced and translucent when the initial feed stock has such characteristics. The particles made in accordance with this invention are crock resistant (the colors will not rub off) and successive portions of different colors can be pre-expanded and molded in the same equipment without cross contamination.

A dye assistant can be used in the process of the invention, if desired, to help the dye be more readily absorbed into the polymer granules. Epoxidized fatty oils have been found to be particularly suitable compounds for this purpose.

A particularly great advantage of this invention is that the order in which the steps of the process is carried out is not particularly critical. For example, the polymer particles can be suspended in an aqueous medium and the dye added thereafter, or the dye can be added to the aqueous medium and then the granules can be added thereto. The penetrant can be added at any time. In fact, part or all of the penetrant can be dispersed within the polymer granules before the granules are added to the aqueous medium or before the dye is added to the aqueous suspension of the granules. Surprisingly, the penetrant is effective although it is incorporated into the granules at the start of the process of the invention. The reason for this, it is believed, is that sufficient penetrant continuously diffuses out of the particles and into the aqueous medium to dissolve the dye and then returns within the granules bringing with it into the granules the dye so that dye is forced within the granules.

Alternatively the aqueous medium can be prepared by adding the dye and the penetrant directly to the polymerization reaction where the styrene monomer has undergone a suspension polymerization reaction, and the polymerization is substantially complete. Adding the dye to the suspension at the time the polymerization has proceeded so that only 90–95% of the monomer is converted to polymer has been found to interfere with the dyeing of the granules and the completion of the polymerization. On the other hand adding the dye when the polymerization is substantially complete, for example only 0.3% of the monomer remains to be polymerized has been found to be successful.

It seems that suspending the particles in an aqueous medium helps to disperse the dye and penetrant uniformly through the medium and prevents any agglomeration of the polymer granules that tends to occur if the particles become sticky at the elevated temperatures employed in the process.

The polymer particles can be suspended in the aqueous medium by suspending agents such as those conventionally employed in the suspension polymerization of styrene monomers. Typical suspending systems, for example, are polyvinyl alcohol; tricalcium phosphate and dodecylbenzene sodium sulfonate; hydroxyethyl cellulose and polyoxyethylene sorbitan monolaurate; etc.

The dyes useful in the present invention are the organic water-insoluble, oil-soluble dyestuffs which are soluble in organic solvents. Particularly favorable results are obtained with the water-insoluble, oil-soluble dyestuffs of the azo, anthraquinone and quinoline series. A partial list of dyes (with the Colour Index given when available) that provide particularly favorable results are:

TABLE I

| Dye | CI | Color |
| --- | --- | --- |
| 1,4-diethylaminoanthraquinone | | Blue. |
| 1-methylaminoanthraquinone | | Red. |
| 1-(o-tolylazo)-2-naphthol | 12100 | Orange. |
| 1,4-di-(p-toluidino)anthraquinone | 61565 | Green. |
| 1,4-diisopropylaminoanthraquinone | | Blue. |
| 1-toluidino-4-hydroxyanthraquinone | | Violet. |

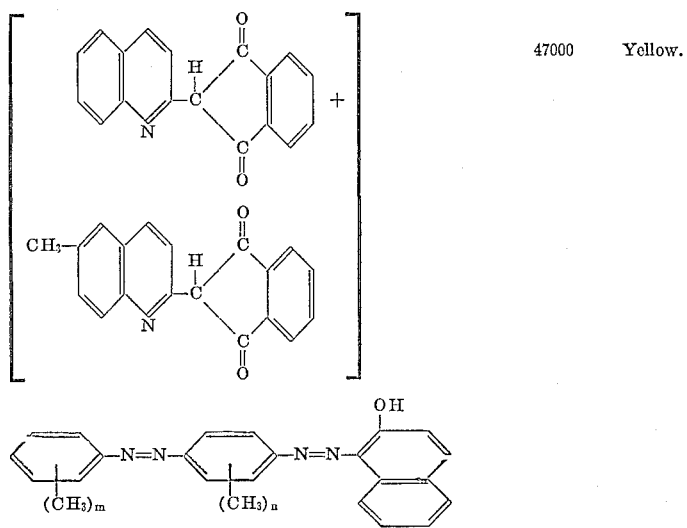

47000  Yellow.

where $m$ and $n$ can be either 1 or 2.

The amount of dye to be used depends upon the intensity of the color desired and will vary anywhere from .01–5% by weight of polymer. The upper limit is usually dictated by economic considerations, since essentially no deepening of the resultant color occurs when more than 5% by weight of dye is used.

It is significant that substantially all of the dye added to the aqueous medium seems to go into the granules. For example, if the aqueous medium be prepared and the dye added thereto and thereafter the polymer granules and the penetrant added, it will be discovered at some short time after the process has been initiated that the dye seems to have accumulated on the surface of the granules and the aqueous medium is substantially clear and colorless. The dye then penetrates into the interior of the granules as the process is continued. There is, therefore, little waste in the effluent from the process and the granules can be removed from the aqueous medium and the aqueous medium disposed of without the worry of disposing of any dye that might be left in the aqueous effluent. This enables the granules to be separated from the aqueous medium by an ordinary centrifuge. It also means that the dye is completely utilized which results in a very economical process.

Penetrants useful in the present invention include organic solvents for oil soluble dyes which will penetrate the polymer granules without altering the physical appearance of the granules. Advantageously the penetrant is selected from the group of organic materials which can act as a blowing agent for the expandable styrene polymers. These include but are not limited to aliphatic hydrocarbons containing from 1–7 carbon atoms in the molecule, for example, methane, ethane, propane, butane, pentane, hexane, heptane, isopentane, cyclohexane, as well as their halogenated derivatives which boil below the softening point of the styrene polymer and mixtures thereof.

Generally the density of the expandable styrene polymer, for example, when it is subjected to heat to produce a foamed structure, is inversely proportional to the amount of blowing agent incorporated in the polymer. In the practice of this invention, where the penetrant is selected from the class of materials which act as a blowing agent for the expandable polymer, the amount of penetrant to be used is calculated so as to provide, in the final product, that amount of blowing agent needed to produce dyed polymer granules which contain the required amount of blowing agent needed for expansion of the granules to the desired foam density. Therefore, if the polymer granules contain no blowing agent and a final product containing about 6.5% by weight of polymer of a blowing agent such as n-pentane is required then about 8.5% of n-pentane would be added to the aqueous medium to serve as penetrant. If the granules already contained 5% n-pentane then an additional 3–4% of n-pentane or some other penetrant such as isopropyl chloride would be added to the aqueous medium. The excess penetrant is needed since a portion of the penetrant will remain in the vapor phase. In general amounts of penetrant of from 3 to 15% by weight of polymer are employed. Amounts down to a minimum of 0.5% of penetrant are effective to dye the granules, but too little penetrant is present at this limit to render the granules expandable.

In some cases, particularly when using azo dyes, it has been found desirable to add a compound to the aqueous medium which acts as a dye assistant. The assistant helps to solubilize the dye in the penetrant and also aids the dye and penetrant in diffusing into the polymer granules. Particularly suitable dye assistants are those compounds prepared by the epoxidation of natural fatty oils which are mixtures of fatty acid esters such as soybean and linseed oil. These compounds whose preparation is described for example in U.S. Patent No. 2,485,160 have been found useful since they do not adversely affect the molding properties of the granules when used in the required concentration range of from 0.1 to 2.0% based upon the weight of the polymer.

The aqueous medium is maintained at an elevated temperature to enable the dye to become rapidly dispersed throughout each polymer granule. The upper limit of temperature depends on the ability of the suspending agent to keep the polymer granules from agglomerating or changing size as they are being dyed but should not exceed 200° C., at which temperature the polymer is almost liquid. The dyeing time is a function of the temperature; the dyeing time will increase as the temperature decreases and conversely as the temperature increases the dyeing time will decrease. Advantageously, the temperature of the aqueous medium is maintained between 50° and 135° C., since at temperatures below 50° C. an excessively long dyeing time is required to obtain penetration of the granules by the dye and at temperatures above 135° C., it is difficult to maintain the granules in suspension.

Advantageously a superautogenous pressure is maintained on the system by a combination of the partial pressure due to the volatilized portion of the penetrant and, preferably, an inert gas such as nitrogen. As the penetrant enters the granules the partial pressure due to the penetrant decreases and more inert gas can be added to maintain the desired pressure. The same effect, of course, can be obtained by gradually increasing the temperature of the system. The pressure is maintained above atmospheric pressure in order that the penetrant is present as a liquid at the temperatures employed and to cause the dye and penetrant to enter the granules. The dyeing rate will increase with increasing pressure. Advantageously, the pressure is maintained between 30 and 150 p.s.i.g.

The time required to dye granules of a particular size range with any given dye and penetrant will depend upon the temperature and pressure employed. At a temperature of 90° C. and 70 p.s.i.g. pressure, an average dyeing time of about 10 hours is required with 8.5% pentane as penetrant. At autogenous pressure, an increase in temperature is accompanied by a decrease in dyeing time, as follows for typical examples:

| | Hours |
|---|---|
| 110° C. | 6 |
| 115° C. | 4 |
| 120° C. | 2 |
| 130° C. | 1 |

As previously stated, the process can be adapted to dye granules in the polymerization suspension after polymerization has been completed as well as granules which have been recovered from the polymerization mixture. However, it is essential that the polymerization be substantially complete prior to the addition of the dye. Otherwise, the unreacted monomer and peroxides in the system causes deterioration of the dyes which results in an unsatisfactory dyeing of the granules and difficulty in completing the polymerization. Advantageously, the granules are dyed after they have been recovered from the polymerization mixture and screened to size, as this avoids the need for further screening after the granules have been dyed, eliminates the problems of cross contamination of screening stations, and the need for installing separate screening facilities in the plant.

The invention can be used to produce a variety of colored expandable styrene polymers. The term "styrene polymer" as used herein includes a number of homopolymers and copolymers derived from vinyl aromatic monomers including styrene, divinylbenzene, vinyltoluene, isopropylstyrene, alpha-methylstyrene, nuclear dimethylstyrenes, chlorostyrene, vinylnaphthalene, etc., as well as copolymers prepared by the polymerization of a vinyl aromatic monomer with minor amounts of monomers such as butadiene, isobutylene, acrylonitrile, itaconic acid, methyl-methacrylate, etc.

Styrene polymer granules formed by suspension polymerization are spherical or deviates from a spherical shape dependent upon the suspension agent used during the polymerization. After such granules have been subjected to the process of this invention, the granules still retain their physical appearance, except for a change in color which has taken place. This color extends from the surface into the interior of the granules to any desired extent. Advantageously, of course, the granules are homogeneously impregnated with the dye.

The expanding, foaming and fusing properties of the polymer particles are not affected by the presence of the dye. For example, if one aliquot of a batch of expandable polymeric granules purchased on the open market, such as Dylite® F–40B expandable polystyrene, is pre-expanded to a density of about one pound per cubic foot and then molded while a second aliquot taken from the same batch is dyed by the process of this invention in accordance with the formulation and conditions set forth above before it is expanded in a pre-expander and molded in the same fashion as the first aliquot, the results will be substantially the same as to density, fusion, and the like, except that where the foamed structure resulting from the first aliquot is a white structure throughout, the foamed structure from the second aliquot will be uniformly dyed throughout. Thus, if the foamed structure from this second aliquot is cut, for example, with a saw it will be observed that the color is uniform from the surface through to the center of the unit.

This uniformity of color throughout the structure made possible by this invention is a great advantage when compared with structures prepared from polymer granules which are dyed only on the surface. This is because for many commercial operations it is desirable to cut or mill foam structures in order to obtain an item having a certain desired shape. Heretofore, if the dyed structure were cut, the white centers of the granules would give the cut surface a mottled appearance. Now, cut items having uniform color on all surfaces can be produced by using polymer granules which have been homogeneously dyed by the process of the invention.

Figure 1:
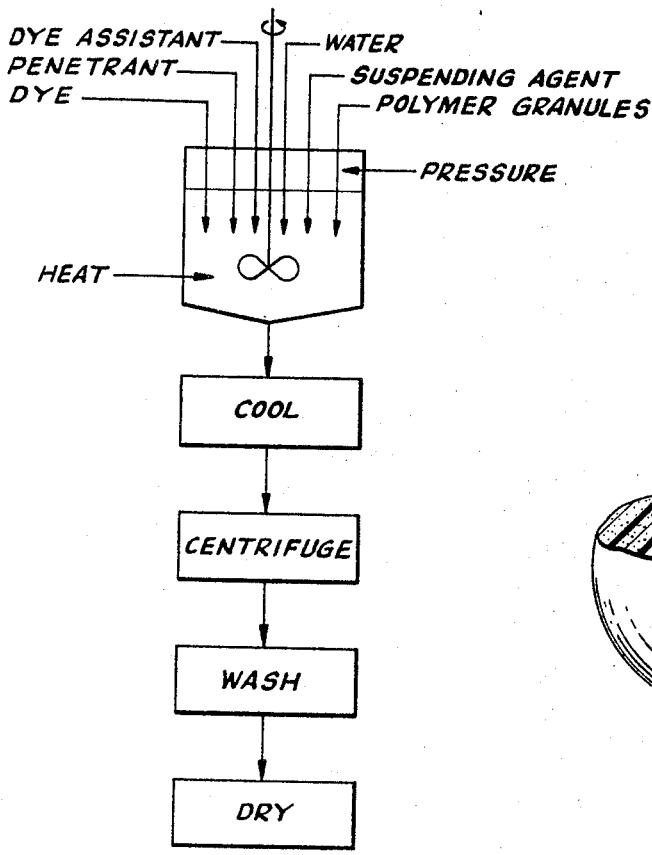
FIGURE 1 illustrates by flow diagram a process for producing the product of this invention.
Figure 2:
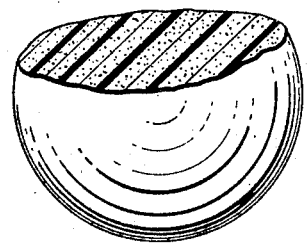
FIGURE 2 illustrates a hemispherical portion of dyed polymer granule produced by the process of this invention.
Figure 3:
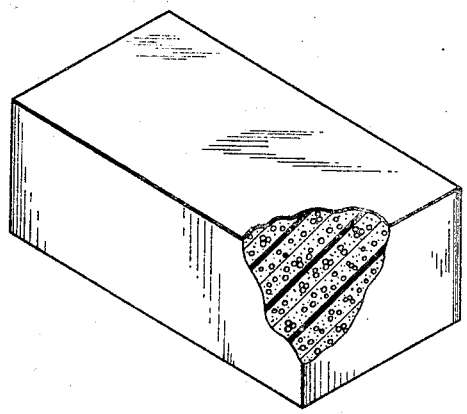
FIGURE 3 illustrates a foam block molded from the product of this invention which has been cut to expose a portion of the interior of the block.

The invention is further illustrated but not intended to be limited by the following examples in which the portions are given in parts by weight.

EXAMPLE I

To a Pfaudler kettle were charged 120 parts of water, and then the suspending agents, 0.06 part of tricalcium phosphate, 0.0032 part of dodecylbenzene sodium sulfonate, and thereafter 0.25 part of a blue dye 1,4-diethylaminoanthraquinone. The mixture was stirred by a three-bladed stirrer at a speed of 110 r.p.m. and the mixing action and suspending agents caused the dye particles to be dispersed throughout the aqueous media. Eighty parts of Dylene 8® polystyrene granules (an injection molding grade of polystyrene which contains no blowing agent) were added. The charged kettle was purged with nitrogen for 10 minutes. The temperature of the system was then raised to 50° C. in approximately 30 minutes under a nitrogen atmosphere of 5 p.s.i.g. The mixing action and suspending agents caused the dye particles and the polymer granules to be dispersed throughout the aqueous medium with essentially no affinity being observed between the dye particles and the granules. The continuous addition of 8.5 parts of the penetrant, n-pentane, was begun when the temperature reached 50° C. and the temperature was raised to 90° C. over a period of about 60 minutes. The pressure had increased to 55 p.s.i.g. due to the increase in temperature. The temperature was maintained at 90° C. for approximately 40 minutes at which time the penetrant addition was completed and the pressure had reached 65 p.s.i.g. The temperature was then raised to 110° C. over the period of approximately 60 minutes and maintained at between 110 and 116° C. for 360 minutes during which time the pressure was maintained constant at approximately 85 p.s.i.g. by the addition of nitrogen as necessary. The slurry was then cooled to 40° C., acidified to a pH of 1.8 with 37% hydrochloric acid to destroy the phosphates and centrifuged to recover the granules. The effluent was clear but tan colored. The granules were washed with water and air dried on open trays. The granules were a deep blue and had a smooth shiny surface. Cutting several of these dry blue granules to expose a cross section of the interior showed that the blue dye was evenly dispersed throughout the granules. The polymer beads contained 7.5% n-pentane which was determined by measuring the weight loss of a gram of dried beads heated for 2 hours at 150° C.

EXAMPLE II

A portion of the granules prepared in Example I was pre-expanded in a Rodman Pre-Expander (U.S. Patent No. 3,023,175) to a density of approximately one pound per cubic foot.

The pre-expanded beads were placed in a conventional mold consisting of a porous mold cavity having dimensions of 20 x 20 x 12" surrounded by a steam chest. Steam at 30 pounds per square inch was introduced into the steam chest to cause the granules to expand and fuse together. After the steam was shut off, cooling water was circulated through the steam chest to cool the molded block until it was self-supporting. The resulting block was then removed from the mold.

The block had a density of 1 p.c.f. It had a smooth, glossy surface which was an even, medium blue color. When the block was sawed to expose the interior the cut surface of the foam was the same color as the outside surface of the block. The fusion on cell structure of the foam block was comparable to blocks molded using non-dyed expandable polystyrene beads.

EXAMPLE III

Example I was repeated except that the penetrant was changed in that 11.0 parts of the penetrant, isopropyl-chloride, were substituted for the 8.5 parts of the penetrant, n-pentane. The dyed granules contained 8.5% of isopropylchloride by weight of polymer and were dyed a deep blue throughout. When a portion of the beads was molded in accordance with the procedure of Example II the molded block was comparable in color and quality to the block produced in Example II.

EXAMPLE IV

There were charged to a Pfaudler kettle in sequence 100 parts of water, the suspending agents, 0.94 part of tricalcium phosphate and 0.013 part of dodecylbenzene sodium sulfonate and 0.25 part of the blue dye 1,4-diethylaminoanthraquinone. The mixture was stirred by a three-bladed stirrer at a speed of 110 r.p.m. and 100 parts of F–40B Dylite ® expandable polystyrene were added. F–40B Dylite ® expandable polystyrene is a commercial product consisting of polystyrene in the form of glossy, smooth surfaced, translucent, spherical white beads which contain a blowing agent. This sample contained 6.9% by weight of n-pentane. The charged kettle was purged with nitrogen for 10 minutes. The temperature was then raised to 50° C. in approximately 30 minutes under a nitrogen atmosphere of 5 p.s.i.g. at which time the addition of 2.0 parts of the penetrant, n-pentane, was begun. The temperature was raised to 90° C. during approximately 60 minutes at which the pressure had increased to 55 p.s.i.g. The temperature was maintained at 90° C. for approximately 40 minutes at which time the addition of the penetrant, n-pentane, was completed and the pressure had reached 65 p.s.i.g. The temperature was then raised to 110° C. over a period of approximately 60 minutes and maintained at about 110° C. for 180 minutes during which time the pressure was maintained at about 85 p.s.i.g. by the addition of nitrogen as necessary. The slurry was then cooled to 40° C., acidified to a pH of about 1.8 with 37% hydrochloric acid to destroy the phosphates and centrifuged to recover the dyed beads. The effluent was clear and colorless. The beads were washed with water and air dried in open trays. The beads were deep blue, glossy, smooth surfaced, translucent spheres. Cutting several beads through their centers showed that the blue dye was evenly dispersed throughout. The product beads contained 7.5% n-pentane as determined by weight loss. A portion of the beads was pre-expanded and molded in accordance with the procedure of Example II. A uniformly colored, medium blue molded block was produced whose characteristics were comparable to those of the molded block of Example II. Also portions of the pre-expanded beads were molded into attractive, blue colored, foamed cups.

EXAMPLE V

Example IV was repeated except that the penetrant was changed in that 3.0 parts of the penetrant trichlorofluoromethane was substituted for the 2.0 parts of the penetrant n-pentane. The dyed product beads contained 8.0 parts by weight of combined n-pentane and trichlorofluormethane. Cutting several of the blue colored beads through their centers showed that the blue dye was evenly dispersed throughout. A portion of the beads was pre-expanded in accordance with the procedure of Example II after which the beads were molded into attractive blue coolers.

EXAMPLE VI

Example IV was repeated except that for the expandable polystyrene beads containing n-pentane there was substituted styrene-acrylonitrile (98%/2% by weight styrene/acrylonitrile) copolymer beads containing 7% by weight of polymer of butane. The product polymer beads contained a total of 7.7% combined butane and n-pentane as determined by weight loss and were an even blue coloration throughout.

EXAMPLE VII

There was charged to a Pfaudler kettle 100 parts of water, the suspending agents, 0.94 part of tricalcium phosphate and 0.0032 part of dodecylbenzene sodium sulfonate, the dye assistant, 0.3 part epoxidized linseed oil, and the red dye, 0.5 part 1-methylaminoanthraquinone. The mixture was stirred at a stirrer speed of 110 r.p.m. and 100 parts of F–40 Dylite® expandable polystyrene beads containing 4% n-pentane were added. The kettle was purged with nitrogen for 10 minutes and then the mixture was heated to 50° C. in approximately 30 minutes under a nitrogen atmosphere of 10 p.s.i.g. The addition of 4.5 parts of the penetrant n-pentane was then started. The temperature was raised to 90° C. during approximately 60 minutes with the n-pentane addition being completed approximately 120 minutes after the start of the addition. The pressure was increased to 130 p.s.i.g. by the addition of nitrogen. The temperature was maintained at 90° C. for an additional 360 minutes after the completion of the n-pentane addition. The aqueous slurry was then cooled to 40° C., acidified to a pH of 1.8 with 37% hydrochloric acid and the beads recovered from the aqueous medium by centrifuging. The effluent was clear with a very faint pink color. The beads were washed with cold water and then air dried in open trays. The dried beads were a deep maroon in color and a cross section of the beads indicated that the dye was uniformly dispersed throughout the polymer beads. A portion of the beads were pre-expanded and molded using the procedure of Example II and an evenly colored medium red foamed structure was produced.

EXAMPLE VIII

Example IV was repeated substituting for the 1,4-diethylaminoanthraquinone the dyes at the concentrations indicated in Table II below, except that a final temperature of 115° C., instead of 110° C., was utilized at a pressure of 85 p.s.i.g. The total time to 115° C. was 180 minutes with the temperature maintained at 115° C. for an additional 60 minutes. The dyes beads were molded in accordance with the procedure set forth in Example II.

raised to 115° C. to complete the polymerization. After the polymerization was completed 0.1 part of the dye Solvent Yellow 33 was added to the suspension and the dyeing process completed and the granules recovered

TABLE II

| Colorant | CI | CI name | Percent conc. of dye | Hue of dyed particles | Molded beads |
|---|---|---|---|---|---|
| -(o-tolylazo)-2-naphthol | 12100 | Solvent Orange 2 | 0.5 | Brilliant Orange | Medium Orange. |
| 1,4-di-(p-toluidino)-anthraquinone | 61565 | Solvent Green 3 | 0.5 | Deep Green | Medium Green. |
| 1,4-diisopropylaminoanthraquinone | | | 0.1 | Medium Blue | Pastel Blue. |
| [quinoline phthalide structure] | 47000 | Solvent Yellow 33 | .25 | Intense Yellow | Bright Yellow. |
| [bis-azo naphthol structure with (CH₃)m and (CH₃)n where m and n can be either 1 or 2] | | | 1.0 | Deep Maroon | Deep Red. |
| 1-toluidino-4-hydroxyanthraquinone | | | .25 | Deep Purple | Pastel Violet. |

EXAMPLE IX

To a Pfaudler kettle there was charged in sequence 100 parts of styrene monomer, the catalysts, 0.37 part of benzoyl peroxide, and 0.10 part of t-butyl perbenzoate, 102 parts of water and 0.10 part tetrasodium pyrophosphate. The mixture was stirred at an impeller speed of 80 r.p.m., heated to 92° C. and maintained at that temperature for 360 minutes. Approximately 80 minutes after reaching 92° C. 0.10 part of the suspending agent hydroxyethyl cellulose was added and the impeller speed increased to 110 r.p.m. After the 360 minutes at 92° C. had elapsed the temperature was raised to 115° C. for 300 minutes to complete the polymerization. At this time the granules of polymer by sample contained less than .2% residual monomer. To this suspension there was added 0.20 part of the suspending agent polyoxyethylene sorbitan monolaurate, 0.1 part of the dye Solvent Yellow 33 and 8.5 parts of the penetrant n-pentane. The pentane addition was completed in 60 minutes. The pressure was adjusted to 100 p.s.i.g. by adding nitrogen and maintained at 100 p.s.i.g. by additional nitrogen added as necessary. After 200 minutes from the completion of the pentane the mixture was cooled to 40° C., and the styrene polymer which was in the form of substantially spherical, glossy, smooth surfaced, translucent yellow granules were recovered by centrifuging. The effluent was clear and colorless. The beads were washed with cold water and air dried on open trays. A portion of the granules which were a medium yellow were pre-expanded in accordance with the procedure of Example II and molded into foamed cups which were a pastel shade of yellow.

EXAMPLE X

Example IX was repeated except that the 0.2 part of the suspending agent polyoxyethylene sorbitan monolaurate and 8.5 parts of the penetrant n-pentane were added after the temperature had been maintained at 92° C. for 360 minutes and before the temperature was raised to 115° C. to complete the polymerization. After the polymerization was completed 0.1 part of the dye Solvent Yellow 33 was added to the suspension and the dyeing process completed and the granules recovered as in Example IX. The granules were comparable in color and molding properties with those prepared in Example IX.

The foregoing has described a novel process for producing colored expandable thermoplastic granules. It produces granules which are evenly dyed throughout. The foamed articles produced from the uniformly dyed granules will have a uniform color. The process does not change the properties of the granules with respect to their size, surface or molding characteristics.

Furthermore the process is economical since there is no need to provide additional plant facilities to dye the granules and, in fact, if desired the dyeing and the impregnation of the granules with blowing agent can be carried out simultaneously.

I claim:
1. A process for dyeing thermoplastic styrene polymer granules which comprises dispersing from 0.01 to 5.0 percent by weight of polymer granules of an organic solvent-soluble, water-insoluble dye, from 0.5 to 15 percent by weight of polymer granules of a penetrant which is a solvent for said dye and which will penetrate said granules without altering their physical appearance, from 0.1 to 2.0 percent by weight of polymer granules of an epoxidized fatty oil, and said granules in an aqueous medium with the aid of a suspending agent, maintaining said dispersion under pressure above about 30 p.s.i.g. and at a temperature between about 40 and 135° C. until said dye is evenly dispersed within said granules, and separating said granules from said aqueous medium.

2. Process of claim 1 wherein said penetrant is a blowing agent for said granules selected from the group consisting of saturated aliphatic hydrocarbons having from 1–7 carbon atoms, their halogen derivatives boiling below the softening point of the polymer, and mixtures thereof.

3. A dyed, expandable thermoplastic styrene polymer granule comprising a styrene polymer granule having a smooth, curved, convex surface and having substantially evenly dispersed therein from 3 to 15 percent by weight of said polymer of a blowing agent and from .01 to 5 percent of a water-insoluble, organic solvent-soluble dye.

4. A dyed thermoplastic styrene polymer granule comprising a styrene polymer granule having a smooth, convex surface and having substantially evenly dispersed therein from .01 to 5 percent by weight of said polymer of a water-insoluble, organic solvent-soluble dye.

5. A foamed structure of expanded thermoplastic styrene polymer which is evenly colored throughout by means of from .01 to 5 percent by weight of said polymer of a water-insoluble, organic-solvent-soluble dye.

6. A process for producing dyed expandable thermoplastic styrene polymer granules which comprises suspending said granules in an aqueous medium with the aid of a suspending agent, dispersing in said medium from 0.01 to 5.0 percent by weight of polymer of a water-soluble, organic-solvent-soluble dye, and from 3 to 15 percent by weight of polymer of a blowing agent which is a solvent for said dye and which will penetrate said granules without altering their physical appearance, said blowing agent being selected from the group consisting of aliphatic hydrocarbons containing from 1–7 carbon atoms of the molecule, halogenated hydrocarbons containing from 1–7 carbon atoms in a molecule which boil at a temperature below the softening point of said polymer, and mixtures thereof, and maintaining said suspension at an elevated temperature of from 40 to 135° C. under at least autogenous pressure above about 30 p.s.i.g. until said solvent forces said dye into the interior of said granules such that said dye is substantially evenly dispersed within said granules and thereafter recovering said granules from said medium.

7. A process for dyeing thermoplastic styrene polymer granules which comprises dispersing with the aid of a suspending agent from 0.01 to 5.0 percent by weight of polymer granules of an organic solvent-soluble, water-insoluble dye, from 0.5 to 15 percent by weight of polymer granules of a penetrant which is a solvent for said dye and which will penetrate said granules without altering their physical appearance, and said granules in an aqueous medium, maintaining said dispersion under a pressure above about 30 p.s.i.g. and at a temperature above about 40° C. and below about 200° C. until said dye is evenly dispersed within said granules.

8. A process for dyeing expandable, thermoplastic styrene polymer granules which comprises dispersing with the aid of a suspending agent from 0.01 to 5.0 percent by weight of polymer granules of an organic solvent-soluble, water-insoluble dye, and said granules containing from 3.0 to 15 percent by weight of a blowing agent, in an aqueous medium, dispersing an additional 0.5–15 percent by weight of polymer granules of blowing agent in said medium, said blowing agent being a solvent for said dye which will penetrate said granules without altering their physical appearance, maintaining said dispersion under a pressure above about 30 p.s.i.g. and at a temperature above about 40° C. and below about 135° C. until said dye penetrates said granules, separating said granules from said aqueous medium.

9. The process of claim 7 wherein said solvent is a blowing agent for said granules, said blowing agent being present in an amount of from 3 to 15 percent by weight of granules and being a compound selected from the group consisting of aliphatic hydrocarbons containing from 1–7 carbon atoms in the molecule, halogenated hydrocarbons containing from 1–7 carbon atoms in the molecule which boil at a temperature below the softening point of said polymer, and mixtures thereof.

10. The process of claim 8 wherein said blowing agent is a compound selected from the group consisting of aliphatic hydrocarbons containing from 1–7 carbon atoms in the molecule, halogenated hydrocarbons containing from 1–7 carbon atoms in the molecule which boil at a temperature below the softening point of said polymer, and mixtures thereof.

References Cited

UNITED STATES PATENTS

| | | | |
|---|---|---|---|
| 2,485,160 | 10/1949 | Niederhauser et al. | 260—348 |
| 3,020,247 | 2/1962 | Bianco | 8—4 X |
| 3,023,175 | 2/1962 | Rodman | 260—2.5 |
| 3,059,987 | 10/1962 | Baumann | 8—4 |
| 3,324,052 | 6/1967 | Zuern et al. | 260—2.5 |

NORMAN G. TORCHIN, *Primary Examiner.*

T. J. HERBERT, *Assistant Examiner.*